Feb. 21, 1967　　　　M. BÖRNER　　　　3,304,785
ANGULAR VELOCITY TRANSDUCER
Filed Jan. 27, 1964　　　　　　　　　　2 Sheets-Sheet 1

INVENTOR
Manfred Börner
BY Spencer & Kaye
ATTORNEYS

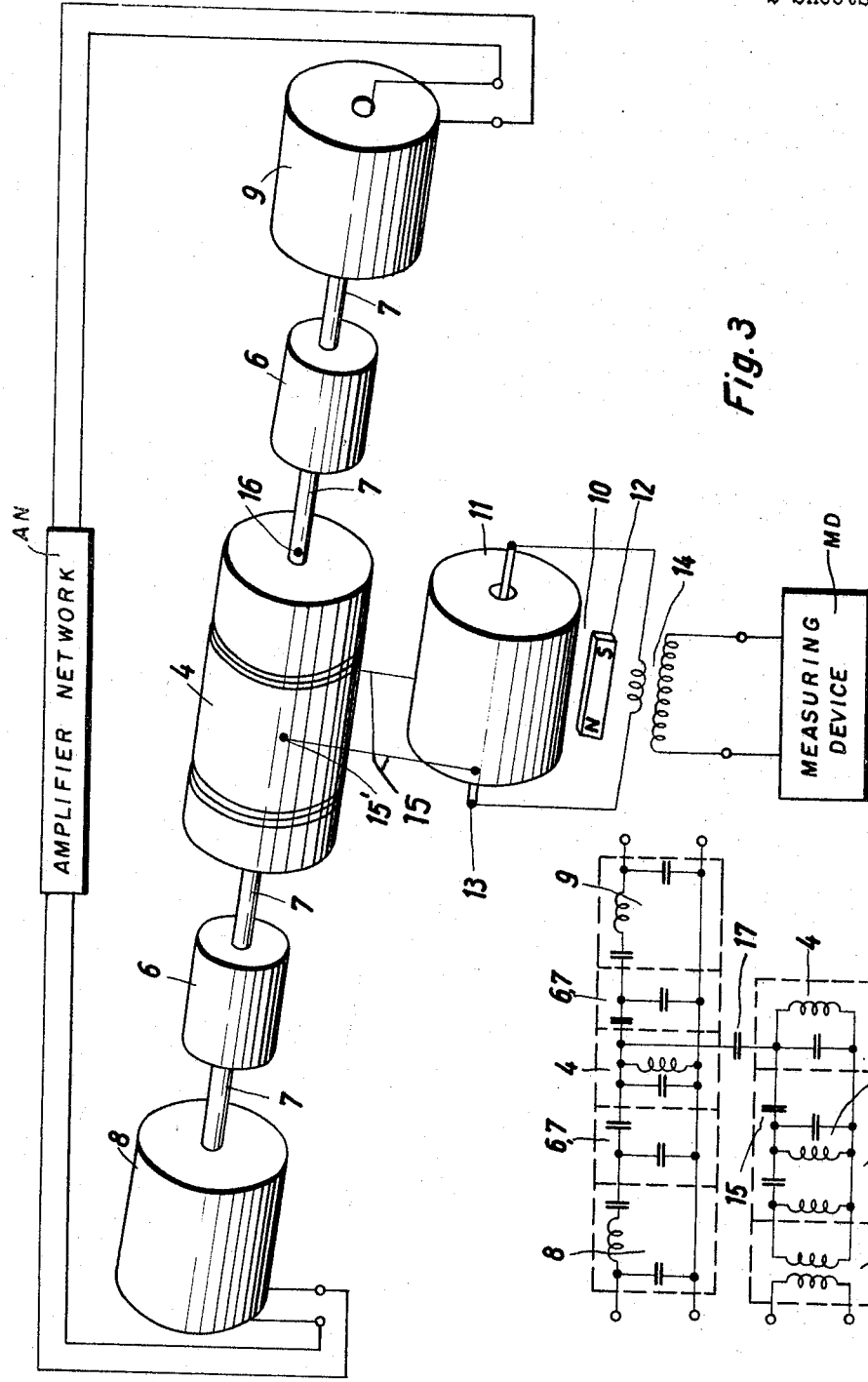

3,304,785
ANGULAR VELOCITY TRANSDUCER
Manfred Börner, Ulm (Danube), Germany, assignor to Telefunken Patentverwertungs G.m.b.H., Ulm (Danube), Germany
Filed Jan. 27, 1964, Ser. No. 340,243
Claims priority, application Germany, Jan. 26, 1963, T 23,385
7 Claims. (Cl. 73—505)

The present invention relates generally to the transducer art, and, more particularly, to a device for measuring angular velocities and which includes a resonant system having a moment of inertia with respect to an axis of rotation and which is periodically variable by means of external electromechanical excitation for obtaining torsional oscillations within the resonant system in dependence upon rotation about the axis of rotation.

Such devices are used, for example, in the control and steering systems of manned and unmanned crafts. They can be used for the representation of an artificial horizon in airplanes or generally can be used to create a fixed reference coordinate system for freely movable flying objects such as aircraft.

There are known angular velocity measuring apparatus which are based on a principle illustrated diagrammatically in FIGURE 1. If a tuning fork 1 is oscillating at its natural or eigenfrequency and is set into slow rotation about its longitudinal axis of symmetry 2, this tuning fork will additionally carry out a torsional oscillation at a frequency which corresponds to the tuning fork resonant frequency. The amplitude of this resonant frequency depends upon the speed of rotation and the phase relationship of this resonant frequency depending upon the direction of rotation. In accordance with the theorem relating to the conservation of energy, the tuning fork prongs lag with respect to the rotation if they move away from the axis of rotation 2 with respect to their rest position, that is, if the resonant system has a larger moment of inertia. Conversely, the tuning fork prongs lead the rotation if they approach the axis of rotation 2 with respect to their rest position, that is, if the resonant system has a smaller moment of inertia. In such known devices the torsional oscillation is measured at a torsion rod 3 which is arranged along the axis of rotation.

In these known devices there is the disadvantage that the accuracy of measurement is only very limited because it is impaired by bending oscillations in the torsion rod. These oscillations, on the one hand, are caused by external shocks and vibrations which, due to the nature of the arrangement, can never be completely avoided and are transmitted through the torsion rod very well because of the relatively fixed mounting, and, on the other hand, they are caused by even the slightest amount of asymmetry in the oscillating system.

With these defects of the prior art in mind, it is a main object of the present invention to effectively suppress the impairment of accuracy which had been due to bending oscillations in the torsion rod of prior art devices.

Another object of the present invention is to provide a device of the character described wherein an oscillating system is provided which, because of its mechanical construction, is capable of oscillating at substantially higher frequencies.

A further object of the present invention is to provide a device of the character described wherein the oscillating system is provided with such a form that it is very easily possible to construct an extremely symmetrical arrangement.

These objects and others ancillary thereto are accomplished in accordance with preferred embodiments of the invention wherein the most essential component of the resonant system for measuring angular velocities and for fulfilling the above-mentioned objects is a symmetrical resonator which can be excited to longitudinal oscillations of the $n\lambda/2$ resonance in the direction of the axis of rotation. This symmetrical resonator is constructed so that the $n\lambda$ resonance of the torsional oscillation of the resonator is also at least near the resonant frequency of the longitudinal oscillations, where $n$ is equal to 1, 2, 3, . . .

It is particularly advantageous to excite the resonator to longitudinal oscillations having a frequency corresponding to the $\lambda/2$ resonance with the resonator being shaped so that when rotating about an axis in the longitudinal oscillation direction, torsional oscillations of the same frequency are carried out but at the $\lambda$/resonance of the resonator.

A device constructed in accordance with the present invention is capable of oscillating at substantially higher frequencies than the disturbing bending oscillations in the elements external to the device and it should be noted that vibrations and shocks which affect the system from the outside can only influence the measurement negatively if they have portions of such high frequencies which fall within the range of the frequency used in the measuring device.

Additional objects and advantages of the present invention will become apparent upon consideration of the following description when taken in conjunction with the accompanying drawings in which:

FIGURE 3 is a diagrammatic perspective view of one embodiment of the present invention.

FIGURE 4 is the equivalent circuit diagram of the FIGURE 3 arrangement.

Figure 1:
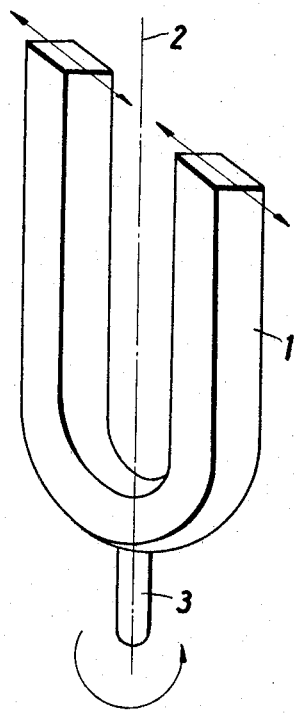
FIGURE 1 is a schematic perspective view of a tuning fork arrangement of the prior art.
Figure 2:
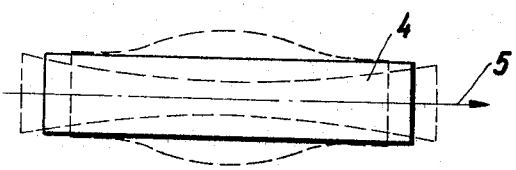
FIGURE 2 is a schematic elevational view of a resonator.

With more particular reference to the drawings, FIGURE 2 illustrates a resonator 4 and it may be assumed that at the same frequency, of, for example 200 kilocycles, it has its $\lambda/2$ resonance in the direction of the axis of symmetry 5 as well as its torsional $\lambda$ resonance.

If the resonator 4 is excited to longitudinal oscillation, of the type mentioned above, in the direction of its axis of symmetry 5, the resonator constricts in the center and the end surfaces of the resonator expand, while when the end surfaces constrict the center of the resonator bulges or expands. These deformations are designated in dashed lines in FIGURE 2. If the resonator is, at the same time, set into rotation about the axis of symmetry 5, then in the manner described above in connection with the tuning fork, the thicker portions of the oscillator lag and the thinner portions of the oscillator lead with respect to the rotation effective externally. It does not automatically occur that a resonant body as illustrated in FIGURE 2 will possess, at the same frequency, the $\lambda/2$ frequency of the longitudinal oscillation and the $\lambda$ resonance of the torsional oscillation. This property of the resonator which contributes substantially to an increase in the sensitivity of the device can be provided by forming annular grooves at those places of the cylindrical resonator at which the nodal planes of the torsional $\lambda$ oscillation are located. Essentially, the restoring force of the torsional oscillation is weakened and the frequency of this mode of oscillation is thereby lowered. In contradistinction to this, the $\lambda/2$ resonant frequency of the longitudinal oscillation remains unaffected because at this place, mass as well as restoring force are removed for the latter mode of oscillation. Such a resonator is shown as element 4 in FIGURE 3 which figure is an embodiment of the present invention for measuring angular velocity.

A high-frequency generator may be used for exciting the longitudinal oscillators in resonator 4. This high-frequency generator feeds its alternating voltage to an electromechanical transducer 8 which is weakly coupled with the resonator 4. The torsional oscillations produced by the rotation of the resonator can then be transformed into electrical alternating voltages by means of electromechanical transducers constructed in any desired manner and which are coupled to the resonator at suitable places. These electrical alternating voltages are then fed to a measuring amplifier.

However, it is particularly advantageous to excite the resonant system to inherent or natural oscillations with the aid of a feedback circuit by means of an amplifier network AN. See for example C. Rint, Handbuch für Hochfrequenz- und Elektrotechniker, Part II, p. 173, FIG. 23. The oscillating system illustrated in FIGURE 3 may be used for this purpose. The resonator 4 has already been described insofar as its construction is concerned. This is the essential part of the system wherein the longitudinal $\lambda/2$ resonance and the torsional $\lambda$ resonance of the resonator lie at one and the same frequency. The resonator 4 is coupled with an input transducer 8 and an output transducer 9 by means of coupling elements 6 and 7 having a construction which provides a coupling which is as weak as possible. Such a device has been described first by W. van B. Roberts and L. L. Burns in RCA Review, 10 (1945), p. 354. This particularly weak coupling between the resonator 4 and the electromechanical transducers 8 and 9 which are constructed of several $\lambda/4$ coupling elements of different oscillatory resistance, is very desirable because the resonator 4 is thereby damped as weakly as possible so that the sensitivity of the system is increased. In particular, this type of coupling has the characteristic of decoupling the torsional oscillation almost completely from the electromechanical transducers 8 and 9 so that there it is rendered possible for a torsional oscillation to occur in the resonator 4 even at the smallest angular velocities. The electrical contact terminals of the input transducer 8 and the output transducer 9 are connected to the amplifier network AN and this causes feedback oscillations corresponding to the resonant frequency of the resonator 4.

A torsion transducer 10 is provided in order to transform the mechanical torsional oscillations of the resonator 4 to electric signals. This can be the type of transducer set forth in co-pending application Serial No. 258,321, filed February 13, 1963. As illustrated in FIGURE 3, a torsionally oscillating magnetostrictive transducer 10 is constructed of a tubular magnetostrictive oscillator 11, a permanent magnet 12, and a ring core winding which includes a single massive and sufficiently rigid winding 13 which serves at the same time for supporting the magnetostrictive tubular oscillator. Since the voltage delivered by the torsionally oscillating magnetostrictive transducer 10 is very small and low-ohmic, the alternating voltage produced in the ring core winding is generally fed first to a matching transformer 14 and then to the measuring device MD. The measuring device may be for example a common high sensitivity voltmeter for the used frequency or a normal smallband receiver. It is also possible to use a lock-in-detector, which gives information about the direction of the rotation of the system.

Different factors have to be considered when coupling the transducer 10 to the resonator 4 by means of longitudinally oscillating coupling lines 15 and these depend upon the task which the device is to perform. If the coupling factor of the torsional oscillations between resonator 4 and the transducer 10 are to reach as large a value as possible, the longitudinal oscillations have to be coupled as weakly as possible, and the coupling lines 15 are suitable to be mounted at those points on the surface of the resonator 4 at which the longitudinal oscillation is at a minimum. This point on the resonator 4 is along the nodal plane of the longitudinal oscillation at $\lambda/2$ resonance which is at the center of the resonator 4. Such a mounting point is marked on the resonator 4 and designated at reference numeral 15'.

This type of coupling of the torsional oscillations of resonator 4 with the transducer 10 at as large a coupling factor as possible does not always result in optimal sensitivity of the device. Because of the high coupling factor, too large a damping of the torsional oscillations in the resonator 4 may very easily arise so that these latter oscillations are eliminated by this damping at very small angular velocities of the rotation to be measured. Because of this it may be necessary to mount the coupling lines 15 at those places along the resonator at which intermediate values between the maximal and the minimal the coupling factor of the torsional oscillation occurs.

For example, if the coupling lines are mounted at those points of the coupling elements 7 designated at 16, only a very small coupling factor of the torsional oscillation with the transducer 10 is provided. Also, when mounting the coupling elements at points 16, hardly any disturbances due to the longitudinal oscillation of the resonator 4 arise because these disturbances are only transmitted by bending oscillations of the coupling lines 15 which do not excite the torsion transducers 10 because of the symmetrical construction using two coupling lines 15.

For measuring the electrical alternating voltage delivered by the torsion transducer 10, devices which are known per se may be used, and if attention is directed to in-phase rectification, information about the sense of direction of the rotation can be obtained.

An electrical device is for example described in Final Engineering Report on second portion of Gyrotron II Angular Rate Tachometer Development Program, Sperry Report No. 5231–3325, Copy No. 4 (unclassified since Dec. 18, 1959).

With more particular reference to FIGURE 4, the electrical equivalent circuit of the embodiment of FIGURE 3 is illustrated. As may be seen from this equivalent circuit the electrical elements are designated with the respective reference numerals of the mechanical elements which they symbolize. A weakly coupled two circuit band filter is provided having a capacitance 17 which represents a coupling between longitudinal oscillation and torsional oscillation in dependence upon the angular velocity.

For example, if the frequency of the resonator is 100 kc./s., the length of the resonator, made of aluminium is 22 mm. The diameter may be chosen as big as possible, for example 20 mm. By annular grooves the torsional $\lambda$ resonance in the vicinity of at first 140 kc./s. is lowered to 100 kc./s. The grooves have a broadness of 5 mm. and a depth of nearly 1.5–2 mm. and are located in the middle of the two halves of the resonator 9. The grooves may of course have rounded edges.

Figure 5:
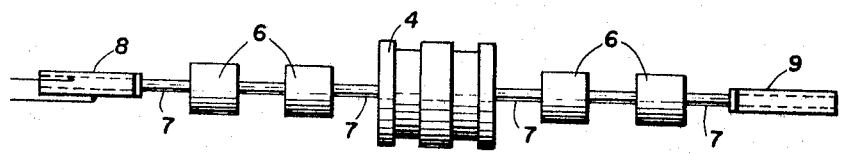
FIGURE 5 is a drawing of a special construction of the device, comprising the resonator, the coupling means and two longitudinal vibrating piezo-electric transducers.

FIGURE 5 shows approximately the dimensions of such a structure. The coupling between the resonator 8 and the resonator 4 is for longitudinal waves in the vicinity of $5.10^{-5}$ and for torsional resonators in the vicinity of $3.10^{-9}$.

It will be understood that the above description of the present invention is susceptible to various modifications, changes, and adaptations, and the same are intended to be comprehended within the meaning and range of equivalents of the appended claims.

What is claimed is:

1. In a device for measuring angular velocities including a resonant system whose moment of inertia with respect to an axis of rotation is periodically variable by means of external electromechanical excitation for producing torsional oscillations within the resonant system in dependence upon rotation about the axis of rotation, the improvement wherein a symmetrical resonator excitable to longitudinal oscillations of the $n\lambda/2$ resonance in the direction of the axis of rotation is the most essential part of the resonant system, said resonator being constructed so that the $n\lambda$ resonance of the torsional oscillation of the resonator is also at least near the resonant frequency of the longitudinal oscillations, where $n$ is equal to 1, 2, 3, . . ., said resonator being of cylindrical shape and provided with means in the form of annular grooves for matching the $n\lambda$ torsional resonance with the frequency of the $n\lambda/2$ longitudinal resonance of the resonator, said grooves being located at the place of at least one of the nodal planes of the torsional oscillation.

2. In a device for measuring angular velocities including a resonant system whose moment of inertia with respect to an axis of rotation is periodically variable by means of external electromechanical excitation for producing torsional oscillations within the resonant system in dependence upon rotation about the axis of rotation, the improvement wherein a symmetrical resonator excitable to longitudinal oscillations of the $n\lambda/2$ resonance in the direction of the axis of rotation is the most essential part of the resonant system, said resonator being constructed so that the $n\lambda$ resonance of the torsional oscillation of the resonator is also at least near the resonant frequency of the longitudinal oscillations, where $n$ is equal to 1, 2, 3, . . ., means for exciting the resonator to longitudinal oscillations at the $\lambda/2$ resonance so that torsional oscillations of the $\lambda$ resonance are carried out at rotations about an axis in the direction of the longitudinal oscillation, said means including an input transducer connected to said resonator, an output transducer connected to said resonator, a source of alternating voltage, said transducers being excitable to longitudinal oscillations by means of the alternating voltage, means mechanically coupling said transducers with the resonator, the output transducer having electrical terminals connected with the input terminals of said source and the output terminals of said source being connected with the terminals of the input transducer, and further comprising a torsion transducer connected to said resonator for feeding to a voltage measuring device, a voltage which is proportional to the torsional oscillations.

3. A device as defined in claim 1 wherein said coupling means include coupling elements for connecting the torsion transducer with the resonator, said coupling elements being mounted to points along the surface of the resonator at which the longitudinal oscillations are at a minimum.

4. In a device for measuring angular velocities including a resonant system whose moment of inertia with respect to an axis of rotation is periodically variable by means of external electromechanical excitation for producing torsional oscillations within the resonant system in dependence upon rotation about the axis of rotation, the improvement wherein a symmetrical resonator excitable to longitudinal oscillations of the $n\lambda/2$ resonance in the direction of the axis of rotation is the most essential part of the resonant system, said resonator being constructed so that the $n\lambda$ resonance of the torsional oscillation of the resonator is also at least near the resonant frequency of the longitudinal oscillations, where $n$ is equal to 1, 2, 3, . . ., a torsion transducer mechanically coupled to said resonator for detecting torsional oscillations, said torsion transducer including a magnetostrictive tubular oscillator, a permanent magnet for polarizing said oscillator, and a ring core winding which is a single massive winding for mounting said oscillator.

5. A device as defined in claim 1 wherein said coupling means include coupling elements for connecting the torsion transducer with the resonator, said coupling elements being mounted to points along the surface of the resonator at which the desired coupling factor of the torsional oscillation with respect to the torsion transducer is obtained, said coupling factor being disposed between the minimal and maximal values which may be obtained.

6. A device as defined in claim 1 wherein said coupling means include coupling elements for connecting the torsion transducer with the resonator, said coupling elements being mounted at one end of the two front faces of the resonator.

7. A device for measuring angular velocities, comprising, in combination:

resonator means having an axis of rotation, and a moment of inertia with respect to said axis of rotation which may be varied periodically for producing torsional oscillations in dependence upon rotation about said axis of rotation, said resonator means being excitable to longitudinal oscillations of $n\lambda/2$ resonance in the direction of the axis of rotation and having the $n\lambda$ resonance of the torsional oscillation of the resonator means near the resonant frequency of the longitudinal oscillations, where $n$ is equal to 1, 2, 3, . . .;

means connected to said resonator means for electromechanically exciting said resonator means to longitudinal oscillations of $n\lambda/2$ resonance, said exciting means including an input transducer, coupling elements mechanically connecting said input transducer to said resonator means, an output transducer, and further coupling elements mechanically connecting said output transducer to said resonator means;

transducer means connected to said resonator means for converting the torsional oscillations of the resonator means into electric signals; and means connected to said transducer means for measuring the voltage of said electric signals to provide a value significant of the angular velocity of said resonator means about the axis of rotation.

References Cited by the Examiner
UNITED STATES PATENTS

| | | | |
|---|---|---|---|
| 2,683,247 | 7/1954 | Wiley | 73—505 X |
| 2,683,596 | 7/1954 | Morrow et al. | 73—505 |
| 3,177,727 | 4/1965 | Douglas | 73—505 |
| 3,182,512 | 5/1965 | Jones et al. | 73—505 |
| 3,194,991 | 7/1965 | Borner et al. | 310—26 |

RICHARD C. QUEISSER, *Primary Examiner.*

JAMES J. GILL, *Examiner.*